United States Patent [19]

Polanek et al.

[11] Patent Number: 5,736,484
[45] Date of Patent: Apr. 7, 1998

[54] NICKEL-CONTAINING HYDROGENATION CATALYSTS

[75] Inventors: Peter Polanek, Weinheim; Harald Schwahn, Wiesloch; Matthias Irgang, Heidelberg; Cristina Freire Erdbrügger, Bobenheim-Roxheim, all of Germany

[73] Assignee: BASF Aktiengesellschaft, Ludwigshafen, Germany

[21] Appl. No.: 704,508

[22] PCT Filed: Mar. 4, 1995

[86] PCT No.: PCT/EP95/00809

§ 371 Date: Sep. 12, 1996

§ 102(e) Date: Sep. 12, 1996

[87] PCT Pub. No.: WO95/24964

PCT Pub. Date: Sep. 21, 1995

[30] Foreign Application Priority Data

Mar. 15, 1994 [EP] European Pat. Off. ......... 94103955

[51] Int. Cl.$^6$ ............... B01J 23/72; C07C 27/00; C10G 19/00; C10G 45/00

[52] U.S. Cl. .............. 502/349; 502/331; 568/861; 208/143; 208/81

[58] Field of Search ................. 502/349, 331; 208/89, 443; 568/861, 881

[56] References Cited

U.S. PATENT DOCUMENTS

| | | |
|---|---|---|
| 4,786,402 | 11/1988 | Anstock et al. ............ 208/443 |
| 4,920,089 | 4/1990 | VanBeek . |
| 4,956,328 | 9/1990 | Froning . |
| 5,068,468 | 11/1991 | Schossig et al. ........... 568/861 |

FOREIGN PATENT DOCUMENTS

| | | |
|---|---|---|
| 96 289 | 12/1983 | European Pat. Off. . |
| 1 450 700 | 9/1976 | United Kingdom . |

*Primary Examiner*—Glenn Caldarola
*Assistant Examiner*—Tanaga A. Boozer
*Attorney, Agent, or Firm*—Keil & Weinkauf

[57] ABSTRACT

A catalyst suitable for hydrogenating organic compounds, essentially containing from 65 to 80% of nickel, calculated as nickel oxide, from 10 to 25% of silicon, calculated as silicon dioxide, from 2 to 10% of zirconium, calculated as zirconium oxide, and from 0 to 10% of aluminum, calculated as aluminum oxide, with the proviso that the sum of the content of silicon dioxide and aluminum oxide is at least 15% (percentages in % by weight, based on the total weight of the catalyst), obtainable by addition of an acidic aqueous solution of nickel, zirconium and, if desired, aluminum salts to a basic aqueous solution or suspension of silicon compounds and if desired aluminum compounds, the pH of the mixture thus obtained being decreased to at least 6.5 and then adjusted to from 7 to 8 by addition of further basic solution, isolation of the solid thus precipitated, drying, shaping and calcining, furthermore a process for preparing the catalysts and their use for preparing medicinal white oil, highly pure medicinal paraffins and low-boiling aromatic-free hydrocarbon mixtures.

12 Claims, No Drawings

NICKEL-CONTAINING HYDROGENATION CATALYSTS

The present invention relates to novel catalysts which are suitable for hydrogenating organic compounds. It furthermore relates to a process for preparing them, their use for preparing medicinal white oil, highly pure medicinal paraffins and low-boiling low-aromatic or aromatic-free hydrocarbon mixtures, and processes for preparing these substances.

Nickel-containing catalysts are often used in industrial plants for hydrogenating organic compounds such as aromatics and amines. EP-A 335 222 describes a process for preparing nickel-containing catalysts of this type, which furthermore contain aluminum oxide, zirconium oxide and, alternatively, silicon dioxide. The active materials are obtained by simultaneous precipitation from a solution containing soluble salts of said metals at pH 7 to 10 by means of a basic compound and are processed by filtration, drying and reduction to give the active catalyst. The catalysts thus obtained can indeed be employed for a multiplicity of different hydrogenation reactions, but their mechanical hardness is unsatisfactory in many cases, ie. the catalysts break up easily when filling industrial reactors or, due to their mechanical disintegration, have an unacceptable lifetime.

It was therefore the object to make available nickel-containing catalysts which do not have these disadvantages.

Modern processes for preparing medicinal white oils operate according to a multistage hydrogenation process. DE-A 23 66 264 and EP-A 96 289 thus describe a two-stage process in which petroleum fractions having a boiling range of from 200° to 550° C. are hydrogenated to give medicinal white oils. In the first hydrogenation stage, the oils employed which, if desired, are previously solvent-refined and deparaffinized are refined on sulfur-resistant hydrogenation catalysts to give industrial white oils. In a second stage, these white oils are further hydrogenated to give medicinal white oils, a nickel-containing catalyst being used in this stage.

The processing of crude paraffins obtained by deparaffinization by means of a two-stage process, in a similar way to the preparation of medicinal white oils, to give highly pure paraffins is described in EP-A 262 389.

A plurality of catalysts for said hydrogenations have already been proposed.

EP-A 290 100 describes supported catalysts containing from 5 to 40% by weight of nickel on aluminum oxide. Nickel-containing supported catalysts containing aluminum oxide as a support material having a BET surface area of from 130 to 190 m$^2$/g are likewise described in U.S. Pat. No. 4,055,481.

DE-A 23 66 264 relates to catalysts which are prepared by precipitation of aqueous solutions which can contain, inter alia, nickel and aluminum. EP-A 96 289 describes a catalyst containing nickel as an active metal on silica.

In the preparation of medicinal white oils and highly pure paraffins, the object consists, inter alia, in a reduction of the aromatic content to a value which does not exceed that fixed by the relevant statutory regulations. The catalyst employed for this hydrogenation must already have a high hydrogenation activity at low operating temperatures, since increased temperatures shift the thermodynamic equilibrium for hydrogenation of the aromatics to the side of the starting substances. Undesired side reactions additionally occur at higher temperatures, eg. due to cleavage of hydrocarbons, which lead to an impairment of product quality by reduction of the viscosity, the flash point and/or the boiling curve. The abovementioned catalysts do not fulfill this requirement of low operating temperature or only fulfill it to an unsatisfactory extent. The employment of catalysts which can be used at a low operating temperature or else brought directly into an industrial plant without prior thermal activation provides a great advantage in industrial operation by shortening the start times and reducing the energy input.

It was therefore a further object to find catalysts for preparing medicinal white oil and highly pure medicinal paraffins and low-boiling aromatic-free hydrocarbon mixtures which fulfill said requirements of a low operating temperature with high activity.

Accordingly, catalysts have been found which essentially contain from 65 to 80% of nickel, calculated as nickel oxide, from 10 to 25% of silicon, calculated as silicon oxide, from 2 to 10% of zirconium, calculated as zirconium oxide and from 0 to 10% of aluminum, calculated as aluminum oxide, with the proviso that the sum of the content of silicon dioxide and aluminum oxide is at least 15% (percentages in % by weight, based on the total weight of the catalyst), which are obtainable by addition of an acidic aqueous solution of nickel, zirconium and, if desired, aluminum salts to a basic aqueous solution of silicon and, if desired, aluminum compounds, the pH being decreased to at least 6.5 and then adjusted to from 7 to 8 by addition of further basic solution, isolation of the solid precipitated in this way, drying, shaping and calcining.

The catalysts according to the invention preferably contain from 70 to 78% of nickel, calculated as nickel oxide, from 10 to 20% of silicon, calculated as silicon dioxide, from 3 to 7% of zirconium, calculated as zirconium oxide and from 2 to 10% of aluminum, calculated as aluminum oxide, with the proviso that the sum of silicon dioxide and aluminum oxide is at least 15%.

In addition to said oxides, the catalysts can contain promoters in amounts of up to 10%. These are compounds such as CuO, TiO$_2$, MgO, CaO, ZnO and B$_2$O$_3$. However, catalysts which contain no promoters are preferred.

Aqueous acidic solutions of nickel, zirconium and, if appropriate, aluminum salts are used as starting materials for preparing the catalysts according to the invention. Suitable salts are organic and inorganic salts such as acetates, sulfates or carbonates, but preferably nitrates of said metals. The total content of metal salts is in general from 30 to 40% by weight. Since the subsequent precipitation of the metals from the solution takes place virtually quantitatively, the concentration of the individual components in the solution depends only on the content of this component in the catalyst to be prepared. The aqueous solution is adjusted to a pH of less than 2 by addition of a mineral acid, preferably nitric acid.

This solution is introduced, expediently with stirring, into an aqueous basic solution which contains silicon compounds and, if desired, aluminum compounds. This solution contains, for example, alkali metal hydroxide or preferably soda, as a rule in amounts from 15 to 40% by weight, based on the solution. The pH is in general above 10.

In addition to sodium silicate, which is preferred, a suitable silicon compound is furthermore SiO$_2$. The silicon content of the solution is expediently from 0.5 to 4% by weight. If desired, the solution can additionally contain aluminum compounds in the form of oxidic solids, although it is preferred only to add aluminum salts to the acidic solution. The addition of the acidic solution to the basic solution is in general carried out at from 30° to 100° C., preferably from 60° to 80° C. As a rule, it is performed over a period of from 0.5 to 4 hours.

A sufficient amount of the acidic solution is added such that the pH falls to at least 6.5. Insoluble compounds are precipitated in this process. A range from 4.0 to 6.5, particularly preferably from 5.5 to 6.5, is preferred. Lower pHs are possible, but do not result in any discernible advantage for the catalysts thus prepared. As a rule, this pH is maintained for from 1 to 60 minutes, depending on the amount of solutions employed, then it is adjusted to from 7 to 8 by addition of further basic solution and the precipitation of the metal compounds is completed at this pH.

If catalysts which contain promoters are desired, it is expedient to add soluble metal salts as precursors for the promoters to one of the solutions described, to coprecipitate these metals and to carry out further processing with the precipitation product thus obtained. However, the promoters can also be added to the precipitation solution as solids.

The precipitated product is isolated, for example by filtration. As a rule, this is followed by a washing step, alkali metal ions and nitrate ions which in particular may have been coprecipitated during the precipitation being washed out. The solid thus obtained is then dried, for which, depending on the amount of material to be dried, a drying oven or a spray drier, for example, can be employed. In general, the drying temperature is from 100° to 200° C. Before the next process step, if desired the abovementioned promoters can be admixed to the solid. The dried product is then preferably calcined, which as a rule is carried out at from 300° to 700° C., preferably from 320° to 450° C., over a period of from 0.5 to 8 hours.

For use according to the requirements, the calcined solid is shaped to give shaped articles, for example by extrusion to give extrudates or by tableting. For this purpose, peptizing agents known per se such as nitric acid or formic acid are added to the calcined solid in amounts from, as a rule, 0.1 to 10% by weight, based on the solid to be shaped. For tableting, graphite, for example, can be used. The shaped articles thus obtained are as a rule calcined at from 300° to 700° C., preferably from 350° to 500° C., over a period of from 1 to 8 hours.

Before the use of the catalysts according to the invention for hydrogenating organic compounds, these catalysts can be activated by reduction with hydrogen or a hydrogen-containing gas, at temperatures which in general are from 150° to 550° C., preferably from 300° to 500° C., the hydrogen partial pressure expediently being from 1 to 300 bar and the reduction being carried out until water is no longer formed.

For storage or for transportation, it has proven expedient to passivate the reduced catalysts. This passivation can be carried out, for example, using carbon dioxide, oxygen or water vapor. In this process the nickel is at least partially converted to its oxidic form. The individual steps of the passivation and the subsequent conversion of passivated catalysts to the active form is described eg. in EP-A 262 389.

The catalysts according to the invention can be used for hydrogenating organic compounds, for example for hydrogenating nitriles, olefins, nitro compounds and aromatic hydrocarbons, and for the aminating hydrogenation of aldehydes and ketones.

The catalysts according to the invention are particularly suitable for preparing medicinal white oils, highly pure medicinal paraffins and low-boiling aromatic-free hydrocarbon mixtures.

Medicinal white oils, highly pure medicinal paraffins and low-boiling low-aromatic or aromatic-free hydrocarbon mixtures are highly refined petroleum fractions which are free of oxygen, nitrogen and sulfur compounds. They contain virtually no aromatic hydrocarbons. Medicinal white oils and medicinal paraffins are mainly used for preparing cosmetics and medicaments and in the foodstuffs sector. For these uses, it is necessary that the products have a neutral taste and are odorless, colorless and/or largely chemically inert. The requirements which apply for white oils and medicinal paraffins are defined by specifications, which are fixed eg. in the USA by the Food and Drug Administration (FDA) or in the Federal Republic of Germany by the German Pharmacopeia (GP) or the communications of the Bundesgesundheitsamtes (Federal Public Health Department, BGA). Low-boiling aromatic-free hydrocarbon mixtures are suitable, for example, as fuels for internal combustion engines.

Medicinal white oils are prepared by hydrogenation of industrial white oils. Specifications also exist for these industrial white oils, eg. according to FDA 178.3620. Industrial white oils can be obtained eg. by sulfuric acid refining of petroleum fractions. However, industrial white oils are preferably used which are obtained by hydrogenation of petroleum fractions which boil above about 200° C. In the case of increased contents of aromatic hydrocarbons and heteroaromatic compounds, these petroleum fractions, if appropriate, are first subjected to solvent refining, eg. with furfurol or N-methylpyrrolidone, in order to reduce the aromatic content. To lower the pour point, the petroleum fractions are as a rule subjected to deparaffinization, which can be carried out both using suitable solvent mixtures, eg. methyl ethyl ketone/toluene, or catalytically. Said petroleum fractions are preferably reacted according to the invention to give the medicinal white oil by means of a two-stage hydrogenation.

Crude paraffins are obtained, for example, in the deparaffinization of petroleum distillates, mainly of lubricating oil fractions. Furthermore, crude paraffins are also separated off from residual oils which previously as a rule were freed by deasphalting asphalts. The deparaffinization can be carried out in a manner known per se, eg. using solvents such as methyl ethyl ketone/toluene mixtures, chlorinated hydrocarbons or using urea. According to the invention, the crude paraffins are preferably hydrogenated to give highly pure medicinal paraffins.

Low-boiling low-aromatic or aromatic-free hydrocarbon mixtures are obtained by hydrogenating petroleum fractions having a start of boiling of less than 200° C., eg. kerosene, light and heavy gasoline. According to the invention said petroleum fractions are preferably hydrogenated in two stages to give low-aromatic or aromatic-free hydrocarbon mixtures.

Other hydrocarbon mixtures having a start of boiling of less than 200° C., eg. reformate gasoline, which as a rule contain less than 100 ppm of sulfur, can preferably be hydrogenated on the catalysts according to the invention in one stage.

The two-stage hydrogenation process described below can be used for preparing the three said substance classes. To do this, the starting substances are subjected to a two-stage hydrogenation on various catalysts, as EP-A 96 289, for example, describes. In a first stage, they can be hydrogenated on sulfur-resistant catalysts, eg. nickel oxide, molybdenum oxide and phosphoric acid on aluminum oxide, which can be prepared by impregnation with a phosphoric acid nickel/molybdenum solution, at from 30 to 200 bar and from 250° to 380° C. The gas-to-starting substance ratio in this reaction is in general from 0.1 to 1 $m^3$ of hydrogen under standard conditions per kg of starting substance. The catalyst loading is expediently from 0.1 to 5 kg of starting substance per liter of catalyst per hour. After this hydrogenation stage, the product obtained is customarily cooled and separated into a gas and liquid phase. The liquid phase can be stripped, eg. with nitrogen or water vapor, to drive off readily volatile fractions. It is then subjected to a second hydrogenation on the catalysts according to the invention. As a rule, the reaction temperature in this process is from 40° to 300° C., preferably from 100° to 250° C., and the pressure is from 5 to 350 bar, preferably from 40 to 200 bar. It has proven advantageous to select a catalyst loading of from 0.1 to 2 kg of starting substance per liter of catalyst per hour and a gas-to-starting substance ratio of from 0.1 to 1 m$^3$ of hydrogen under standard conditions per kg of starting substance.

The hydrogenation can be carried out batchwise, but preferably continuously, in a reactor which contains the catalyst according to the invention in the form of a solid bed and which can be operated in the trickle or liquid-phase procedure.

The catalysts according to the invention have low operating temperatures combined with long service lifes and high throughputs, the internationally customary maximum permissible values according to GP or FDA for the product quality being at least achieved or not exceeded. They are furthermore distinguished by a high mechanical hardness.

EXAMPLES

All percentages given in the examples are percentages by weight.

The amounts of water in liters l always relate to standard conditions.

Examples 1
Preparation of a Catalyst According to the Invention

An aqueous solution of nickel nitrate, aluminum nitrate and zirconium nitrate, which was prepared from zirconium carbonate by addition of nitric acid, which, calculated as oxides, contained 9.0% of NiO, 0.6% of $Al_2O_3$ and 0.6% of $ZrO_2$, was added over a period of about 1 h in a stirred vessel to a 20% strength sodium carbonate solution which contained 1.8% of dissolved $SiO_2$ in the form of sodium silicate such that a pH of 6.0 was achieved. After a further 5 minutes, the pH was increased to 7.5 by addition of further sodium carbonate solution. The temperature during the precipitation was 70° C.

The suspension obtained was filtered and the filtrate was washed with completely demineralized water until the electrical conductivity of the filtrate was about 50 μS. The filtrate was then dried in a spray drier at 125° C. The hydroxide/carbonate mixture obtained in this way was calcined at 350° C. over a period of 1 h.

The catalyst thus obtained had the composition 74.5% of nickel, calculated as NiO, 14.7% of silicon, calculated as $SiO_2$, 5.4% of aluminum, calculated as $Al_2O_3$ and 4.5% of zirconium, calculated as $ZrO_2$.

The catalyst powder was kneaded with 41% of water and 2.5% of conc. nitric acid and extruded to give extrudates of 1.5 mm diameter. The catalyst extrudates thus obtained were calcined at 450° C. over a period of 1 h.

The catalyst extrudates had a porosity of 0.5 ml/g (determined by water absorption), an extrudate hardness of 13.4N (3 lbs/mm, determined by breaking up an extrudate between two stampers and determining the force per unit length of the extrudate necessary for this) and a density of 916 g/l.

Example 2
Preparation of Medicinal White Oil

The catalyst obtained according to Example 1 was reduced at 400° C. and a hydrogen pressure of 5 bar. After cooling, the catalyst was brought to 190° C. in a hydrogenation reactor under a hydrogen pressure of 200 bar. 0.04 kg/h of an industrial white oil A was then hydrogenated with 16 l/h of hydrogen on 0.2 liter of the catalyst at 190° C. and a hydrogen pressure of 200 bar. The liquid phase of the material discharged from the reactor was collected after separating off the gas phase and investigated as described in GP 8 and GP 10.

The analytical data of the medicinal white oils obtained according to the invention after the comparatively short service life of 168 h are shown in Table 2.

TABLE 1

Analytical data of the industrial white oils employed

|  | A | B |
| --- | --- | --- |
| Density at 15° C. [g/cm$^3$] | 0.862 | 0.865 |
| viscosity 40° C. [mm$^2$/s] | 71.4 | 70.6 |
| Aromatic content according to Brandes [% by weight] | 3.9 | 3.7 |
| S content [ppm] | 2 | 2 |
| Boiling range ASTM D 1160 | | |
| Start of boiling | 395 | 388 |
| 10% | 458 | 465 |
| 50% | 493 | 498 |
| 95% | 540 | 541 |

Example 3—Comparison Experiment

In this comparison experiment a catalyst was used whose preparation is described in EP-A 96 289, catalyst A. The comparison catalyst was present in the form of 1.5 mm extrudates and had a porosity (measured by means of water absorption) of 0.54 ml/g, an extrudate hardness of 13.4 N/mm and a density of 1.1 g/l. As described in DE-A 36 29 631, the comparison catalyst was reduced with hydrogen at 440° C. and activated in a hydrogenation reactor at 440° C. and a hydrogen pressure of 80 bar.

0.04 kg/h of the industrial white oil A was hydrogenated with 16 l/h of hydrogen on 0.2 liter of the comparison catalyst at 190° C. and a hydrogen pressure of 200 bar. The liquid phase of the material discharged from the reactor was investigated as in Example 2. The analytical data of the medicinal white oil obtained in the comparison experiment are given in Table 2 after the comparatively short service life of 168 h. Using the catalyst according to the invention results in distinctly better analytical values. The catalyst according to the invention additionally has a distinctly lower operating temperature than the comparison catalyst in order to achieve said distinctly better analytical values.

Example 4
Longer Service Life 0.04 kg/h of the industrial white oil A was hydrogenated with 16 l/h of hydrogen at 190° C. and a hydrogen pressure of 200 bar on 0.2 liter of the catalyst according to the invention as described in Example 1, which was reduced as described in Example 2. The liquid phase of the material discharged from the reactor was investigated as in Example 2. The analytical data of the medicinal white oil obtained according to the invention after a service life of 2760 h are shown in Table 2.

Example 5—Comparison Experiment
Longer Service Life in Comparison with Example 3

0.04 kg/h of the industrial white oil was hydrogenated with 16 l/h of hydrogen at 190° C. and a hydrogen pressure of 200 bar on 0.2 liter of the comparison catalyst as described in Example 3. The liquid phase of the material discharged from the reactor was investigated as in Example 2. The analytical data of the medicinal white oil obtained in the comparison experiment after a service life of 1584 h are shown in Table 2. The white oil specifications according to FDA and GP are no longer achieved in the $H_2SO_4$ test after this service life.

The catalyst according to the invention is deactivated more slowly than the comparison catalyst. After the long service life of 2760 h, the white oil specifications were still far from exceeded (see Example 6).

Example 6
Higher Catalyst Loading 0.12 kg/h of the industrial white oil B (see Table 1) was hydrogenated with 48 l/h of hydrogen at 190° C. and a hydrogen pressure of 200 bar on 0.2 liter of the catalyst according to the invention as described in Example 1, which was reduced as described in Example 2. The liquid phase of the material discharged from the reactor was investigated as in Example 2 after a service life of 2760 h. The analytical data of the medicinal white oil obtained according to the invention are shown in Table 2.

Example 7—Comparison Experiment
Higher Catalyst Loading 0.12 kg/h of the industrial white oil B (see Table 1) was hydrogenated with 48 l/h of hydrogen at 190° C. and a hydrogen pressure of 200 bar on 0.2 liter of the comparison catalyst from Example 3. The liquid phase of the material discharged from the reactor was investigated as in Example 2. The analytical data of the white oil obtained in the comparison experiment are shown in Table 2.

In contrast to the comparison catalyst, a medicinal white oil complying with the specification is obtained using the catalyst according to the invention at comparatively high loading.

Example 8
Preparation of Catalyst Tablets

The catalyst powder according to the invention from Example 1 was mixed with 3% graphite and shaped to give 3×3 mm tablets. The catalyst tablets thus obtained were then calcined at 500° C. over a period of 4 h. The catalyst tablets obtained according to the invention had a porosity (measured by means of water absorption) of 0.2 ml/g, a hardness of 5094 N/cm$^2$ (lateral pressure strength; determined by measurement of the force which is necessary for breaking up a tablet laid on the narrow side) and a density of 1551 g/l.

Example 9
Preparation of Medicinal White Oil

The catalyst obtained as described in Example 8 was reduced at 400° C. and a hydrogen pressure of 5 bar. After cooling, the catalyst was brought to 190° C. in a hydrogenation reactor under a hydrogen pressure of 200 bar. 0.04 kg/h of the industrial white oil B was hydrogenated with 16 l/h of hydrogen at 190° C. and a hydrogen pressure of 200 bar on 0.2 liter of catalyst. The liquid phase of the material discharged from the reactor was investigated as in Example 2. The analytical data of the medicinal white oil obtained according to the invention are shown in Table 2.

Example 10—Comparison Experiment

A commercially available catalyst from Mallinckrodt with the designation E-474 TR was used in this comparison experiment. The comparison catalyst was present in the form of 3×3 mm tablets and according to our analytical data had a composition of 74.5% of nickel, calculated as NiO, 14.4% of silicon, calculated as $SiO_2$, 4.4% of aluminum, calculated as $Al_2O_3$ and 3.2% of zirconium, calculated as $ZrO_2$. The catalyst tablet had a porosity (measured by water absorption) of 0.3 ml/g, a hardness of 3559 N/cm$^2$ and a density of 1225 g/l.

The comparison catalyst was activated in a hydrogenation reactor at 250° C. and a hydrogen pressure of 80 bar.

0.04 kg/h of the industrial white oil B was then hydrogenated with 16 l/h of hydrogen at 190° C. and a hydrogen pressure of 200 bar on 0.2 liter of the catalyst. The liquid phase of the yield from the reactor was investigated as in Example 2. The analytical data of the white oil obtained in the comparison experiment are shown in Table 2.

Distinctly better analytical values result with the catalyst according to the invention from Example 9 despite comparable chemical composition.

Example 11
Low Operating Temperature 0.04 kg/h of the industrial white oil A was hydrogenated with 16 l/h of hydrogen at 120° C. and a hydrogen pressure of 200 bar on 0.2 liter of the catalyst according to the invention from Example 1, which was reduced as described in Example 2. The liquid phase of the material discharged from the reactor was investigated as in Example 2. The analytical data of the medicinal white oil obtained according to the invention after a service life of 384 h are shown in Table 2.

Example 12—Comparison Experiment 0.04 kg/h of the industrial white oil A was hydrogenated with 16 l/h of hydrogen at 150° C. and a hydrogen pressure of 200 bar on 0.2 liter of the comparison catalyst as described in Example 3. The liquid phase of the material discharged from the reactor was investigated as in Example 2. The analytical data of the medicinal white oil obtained in the comparison experiment are shown in Table 2 after a service life of 408 h. The white oil specifications according to FDA and GP are no longer achieved at this temperature.

The catalyst according to the invention still achieves the white oil specifications even at a temperature which is 30K lower than in this example.

Example 13
Lower Hydrogen Pressure 0.04 kg/h of the industrial white oil A was hydrogenated with 16 l/h of hydrogen at 190° C. and a hydrogen pressure of 50 bar on 0.2 liter of the catalyst according to the invention from Example 1, which was reduced as described in Example 2. The liquid phase of the material discharged from the reactor was investigated after a service life of 1080 h as in Example 2. The analytical data of the medicinal white oil obtained according to the invention are shown in Table 2.

Example 14—Comparison Experiment 0.04 kg/h of the industrial white oil A was hydrogenated with 16 l/h of hydrogen at 190° C. and a hydrogen pressure of 50 bar on 0.2 liter of the comparison catalyst as described in Example 3. The liquid phase of the material discharged from the reactor was investigated as in Example 2. The analytical data of the white oil obtained in the comparison experiment are shown in Table 2.

In contrast to the comparison catalyst, the specifications for medicinal white oil are very well fulfilled with the catalyst according to the invention at comparatively low pressure.

$SiO_2$, 5.7% of aluminum, calculated as $Al_2O_3$ and 5.6% of zirconium, calculated as $ZrO_2$.

After processing as in Example 15, the catalyst extrudates had a porosity of 0.4 ml/g, an extrudate hardness of 8.0 N/mm and a density of 885 g/l.

A hardness of less than 9 N/mm is not advisable for the employment of the catalysts in the trickle and liquid-phase procedure, as such catalysts only meet the mechanical requirements in the reactor for a short operating period.

TABLE 2

Analytical data of the medicinal white oils

| Ex. | 2 | 3 Comp. | 4 | 5 Comp. | 6 | 7 Comp. | 9 | 10 Comp. | 11 | 12 Comp. | 13 | 14 |
|---|---|---|---|---|---|---|---|---|---|---|---|---|
| Industrial white oil | A | A | A | A | B | B | B | B | A | A | A | A |
| Service life [d] | 7 | 7 | 115 | 66 | 24 | 24 | 22 | 21 | 16 | 17 | 45 | 7 |
| Viscosity | 71.8 | 71.7 | 71.6 | 71.5 | 71.3 | 71.3 | 71.0 | 70.9 | 72.0 | 72.2 | 71.7 | 71.8 |
| UVA according to GP 8 at 275 nm | 0.02 | 0.15 | 0.05 | 0.55 | 0.051 | 0.67 | 0.03 | 0.43 | 0.32 | 0.97 | 0.18 | 1.5 |
| UVA GP 10 | + | + | + | + | + | + | + | + | + | + | + | − |
| $H_2SO_4$ Test according to GP 10 | 0.25–0.5 | 1 | 0.25–0.5 | − | 0.5–1 | − | 0.25–0.5 | 2–3 | 1–2 | − | 0.5 | − |

+ = fulfilled
− = not fulfilled
In the UV-A test, the aromatic content of the white oil is measured by UV absorption. A value which is as low as possible is aimed at. The limiting value according to GP 8 is 0.8 at 275 nm.
In the $H_2SO_4$ test, after extracting the oil by shaking with $H_2SO_4$ the coloration produced by the residual aromatic content is compared with a given color scale. The value 3 must not be exceeded.

Example 15
Catalyst Preparation According to the Invention

An aqueous solution of nickel nitrate, aluminum nitrate and zirconium nitrate which was prepared from zirconium carbonate by addition of nitric acid, which, calculated as oxides, contained 9.0% of NiO, 0.6% of $Al_2O_3$ and 0.6% of $ZrO_2$, was added in a stirred vessel to a 20% strength sodium carbonate solution which contained 1.8% of dissolved $SiO_2$ in the form of sodium silicate such that a pH of 6.0 was achieved (time 45 minutes). After 5 minutes, the pH was increased to 7.0 by addition of further sodium carbonate solution. The temperature during the precipitation was 70° C.

The suspension obtained was filtered and the filtrate was washed with completely demineralized water until the electrical conductivity of the filtrate was about 20 μS. The filtrate was then dried at 120° C. in a drying oven. The mixture of hydroxides and carbonates obtained in this way was calcined at 350° C. over a period of 4 h.

The catalyst thus obtained had the composition 73.9% of nickel, calculated as NiO, 13.9% of silicon, calculated as $SiO_2$, 5.7% of aluminum, calculated as $Al_2O_3$ and 5.7% of zirconium, calculated as $ZrO_2$.

The catalyst powder was kneaded with 54% by weight, based on the powder, of water and 2.6% by weight of conc. nitric acid and extruded to give extrudates of 1.5 mm diameter. The catalyst extrudates thus obtained were calcined at 400° C. over a period of 1 h.

The catalyst extrudates had a porosity of 0.4 ml/g, an extrudate hardness of 10.7 N/mm and a density of 880 g/l.

Example 16—Comparison Experiment
Preparation of a Catalyst by Precipitation at pH 7

Procedure as Example 15, but a pH of 7 was set directly by the addition of the acidic solution to the soda solution.

The catalyst thus obtained had the composition 73.8% of nickel, calculated as NiO, 14.5% of silicon, calculated as Example 17—Comparison Experiment
Comparison Experiment as Example 16, Precipitation at pH 8

Procedure as Example 15, but a pH of 8 was set directly by the addition of the acidic solution to the soda solution.

The catalyst thus obtained had the composition 73.9% of nickel, calculated as NiO, 16.5% of silicon, calculated as $SiO_2$, 5.5% of aluminum, calculated as $Al_2O_3$ and 4.3% of zirconium, calculated as $ZrO_2$.

After processing as in Example 15, the catalyst extrudates had a porosity of 0.3 ml/g, an extrudate hardness of 8.2 N/mm and a density of 955 g/l.

The catalyst according to the invention had the highest hardness at the lowest density.

We claim:

1. A catalyst suitable for hydrogenating organic compounds, containing from 65 to 80 wt % of nickel, calculated as nickel oxide, from 10 to 25 wt % of silicon, calculated as silicon dioxide, from 2 to 10 wt % of zirconium, calculated as zirconium oxide, from 0 to 10 wt % of aluminum, calculated as aluminum oxide, with the proviso that the sum of the content of silicon dioxide and aluminum oxide is at least 15 wt %, obtained by addition of an acidic aqueous solution of nickel, zirconium and, optionally, aluminum salts to a basic aqueous solution or suspension of silicon compounds and, optionally, aluminum compounds, the pH of the mixture thus obtained being decreased to at least 6.5 and then adjusted to from 7 to 8 by addition of further basic solution, isolation of the solid thus precipitated, drying, shaping and calcining.

2. The catalyst of claim 1, wherein the catalyst contains from 70 to 78 wt % of nickel, calculated as nickel oxide, from 10 to 20 wt % of silicon, calculated as silicon dioxide, from 3 to 7 wt % of zirconium, calculated as zirconium oxide and from 2 to 10 wt % of aluminum, calculated as aluminum oxide, with the proviso that the sum of the content of silicon dioxide and aluminum oxide is at least 15 wt %.

3. A catalyst as defined in claim 1, wherein the catalyst is obtained by the addition of nickel nitrate, zirconium nitrate, and optionally a member selected from the group consisting of aluminum nitrate and sodium silicate.

4. A catalyst as claimed in claim 1, wherein the basic aqueous solution used is a soda solution.

5. A catalyst as claimed in claim 1, wherein the obtained catalyst is reduced at from 150° to 550° C. by treatment with hydrogen or hydrogen-containing gases.

6. A process for preparing catalysts as defined in claim 1, which comprises adding an acidic aqueous solution of nickel, zirconium and, optionally aluminum salts to a basic aqueous solution of silicon and, if appropriate, aluminum compounds, the pH of the mixture thus obtained being decreased to at least 6.5 and then adjusted to from 7 to 8 by addition of further basic solution, isolating the solid thus precipitated, and subjecting the isolated solid to drying, molding and calcining.

7. A process for preparing medicinal white oil which comprises hydrogenating industrial white oil over a catalyst as defined in claim 1.

8. A process as defined in claim 7, wherein industrial white oil prepared by hydrogenating on sulfur-resistant catalysts of petroleum fractions boiling above 200° C. is used.

9. A process for preparing highly pure medicinal paraffins by hydrogenation of crude paraffins, which comprises hydrogenating on a catalyst as claimed in claim 1.

10. A process as claimed in claim 9, wherein crude paraffins obtained by deparaffinization of petroleum fractions boiling above 200° C. are used.

11. A process as defined in claim 9, wherein the catalysts are sulfur-resistant.

12. A process for preparing low-aromatic or aromatic-free hydrocarbon mixtures by hydrogenation of petroleum fractions or other hydrocarbon mixtures having a start of boiling of below 200° C., which comprises performing the hydrogenation on a catalyst as claimed in claim 1.

* * * * *